United States Patent
Kelliher et al.

(10) Patent No.: US 7,233,649 B2
(45) Date of Patent: Jun. 19, 2007

(54) FASTER MODEM METHOD AND APPARATUS

(75) Inventors: Timothy L. Kelliher, Alameda, CA (US); P. Michael Farmwald, Portola Valley, CA (US)

(73) Assignee: UTStarcom, Inc., Alameda, CA (US)

( * ) Notice: Subject to any disclaimer, the term of this patent is extended or adjusted under 35 U.S.C. 154(b) by 845 days.

(21) Appl. No.: 10/194,375

(22) Filed: Jul. 12, 2002

(65) Prior Publication Data

US 2004/0008761 A1 Jan. 15, 2004

(51) Int. Cl.
*H04M 11/00* (2006.01)

(52) U.S. Cl. ............... 379/93.05; 379/93.06; 379/399.01; 379/402

(58) Field of Classification Search ........... 379/93.05, 379/93.06, 399.01, 402
See application file for complete search history.

(56) References Cited

U.S. PATENT DOCUMENTS

| 4,393,492 | A | 7/1983 | Bishop |
|---|---|---|---|
| 4,730,311 | A | 3/1988 | Carse et al. |
| H1175 | H | 4/1993 | Georgio |
| 5,260,937 | A | 11/1993 | Eames et al. |
| 5,390,239 | A | 2/1995 | Morris et al. |
| 5,898,761 | A | 4/1999 | McHale et al. |
| 5,905,778 | A | 5/1999 | Shires |
| 5,923,671 | A | 7/1999 | Silverman |
| 6,005,873 | A | 12/1999 | Amit |
| 6,009,106 | A | 12/1999 | Rustad et al. |
| 6,061,392 | A | 5/2000 | Bremer et al. |
| 6,084,874 | A | 7/2000 | Nguyen et al. |
| 6,014,431 | A | 11/2000 | McHale et al. |
| 6,160,808 | A | 12/2000 | Maurya |
| 6,160,843 | A | 12/2000 | McHale et al. |
| 6,169,788 | B1 | 1/2001 | McHale et al. |
| 6,198,749 | B1 | 3/2001 | Hui |
| 6,324,212 | B1 | 11/2001 | Jenness |
| 6,349,123 | B1 | 2/2002 | Kim |
| 6,373,852 | B1 | 4/2002 | Foladare |

(Continued)

FOREIGN PATENT DOCUMENTS

WO  WO 99/20033  4/1999

OTHER PUBLICATIONS

"X-Cel & GDSL System V.90 RIs@ Analog Modem Support," GoDigital Networks-Technical Note, 7 pages, Jan. 23, 2001.

(Continued)

*Primary Examiner*—Jefferey Harold
(74) *Attorney, Agent, or Firm*—McDonnell Boehnen Hulbert & Berghoff LLP

(57) ABSTRACT

A faster modem apparatus communicates with customer premise equipment according to a variety of communication protocols. The faster modem apparatus communicates with customer premise equipment comprising an analog soft-modem comprising a codec. A method utilizes an unused portion of the codec operating range to code and decode data signals having frequencies above 4 kHz. The faster modem apparatus also codes and decodes data signals above 4 kHz. The analog soft-modem and the faster modem apparatus transmit and receive coded analog signals at a signal level of greater than −9 dBm. In one embodiment, the faster modem apparatus is also operative to communicate with additional modems such as dial-up modems and DSL modems. In one embodiment, the faster modem apparatus supports simultaneous voice and data communications.

13 Claims, 4 Drawing Sheets

U.S. PATENT DOCUMENTS 6,895,040 B2 * 5/2005 Zhou .......................... 379/402

OTHER PUBLICATIONS

"Connection Optimized Link Technology," White paper, Ramp Networks, 6 pages, (1998).

"Powerful Internet and Remote Access Platform," WebRamp 361i, 2 pages, Mar. 2000.

"Dualing Modems Reach 112K," Wired News, 3 pages, Feb. 3, 2000.

"SupraSonic Dual Modem: Twice is Nice," PCWorld.com, 3 pages, Jul. 27, 1998.

"Copper Edge 200 RT DSL Concentrator," 4 pages, Aug. 2001.

"Multi-Tenant Unit Profitability Analysis," 10 pages, Dec. 2000.

* cited by examiner

FASTER MODEM METHOD AND APPARATUS

BACKGROUND

Dial-up modems, also known as analog modems, analog dial-up modems, or analog data modems, are common equipment found in or connected to many computers today. One of the most common types of dial-up modems are analog soft-modems, also referred to as soft-modems. Soft-modems are simple devices comprising a minimal amount of circuitry such as codecs for converting analog signals to digital signals and converting digital signals to analog signals, circuitry for interfacing the soft-modem with a microprocessor in a host computer, and circuitry for interfacing the soft-modem with a telephone line of the public switched telephone network (PSTN). The processing of communication data and running of communication protocols is accomplished by software running on the processor of the host computer, thus the term "soft" modem.

Soft-modems run ITU-T V series standard protocols, such as the V.90 standard, on the host computer's processor, but may run an array of protocols by changing the software, or modem driver, executing on the processor. This makes soft-modems upgradeable as new and better communication protocols are developed. It also makes soft-modems inexpensive since the normally expensive circuitry needed to run communication protocols is absent from the soft modem.

Dial-up modems connect to regular voice telephone lines and dial the telephone network the same way a person dials-up another person. The modem takes the telephone line off-hook by a applying a current load to the line of about 20 mA. The current load signals a central office switch that a user needs service. The switch then applies a dial-tone to the telephone line. When the modem hears the dial-tone, the modem dials an Internet Service Provider (ISP) using standard DTMF (dual tone multi-frequency) tones. The switch then connects the customer premise equipment (CPE), in this case the dial-up modem, with a Central Office (CO) modem. The CO modem and the CPE modem then negotiate a connection, or communication link, using audible tones according to a standard such as the ITU-T V.8 standard.

Signal-to-noise (SNR) ratio and bandwidth both impact a modem's ability to effectively transfer information over a communication link. Shannon's law, expressed in the form $C=BW*\log_2(1+SNR)$, defines the theoretical maximum rate at which error-free digits can be transmitted over a bandwidth-limited channel in the presence of noise. C is the channel capacity in bits per second (bps), BW is the bandwidth of the bearer channel in Hz, and SNR is the signal to noise ratio of the bearer channel.

The PSTN terminates calls, such as the negotiated communication link described above, with an 8 bit 8 kHz codec. This limits the bandwidth of the bearer channel, BW, to approximately 4 kHz. In practice, the spectrum from around 200 Hz to 3.4 kHz is used further limiting the bandwidth of the bearer channel to around 3.2 kHz. Additionally, output transmission levels on the PSTN are limited to −9 dBm. Therefore, the SNR varies from loop to loop (the telephone lines connecting the customer premise equipment with the terminating equipment) according to loop length, bundle make up, and other PSTN and system characteristics. While noise can vary, the noise floor for a loop is generally accepted to be approximately −41 dB and the SNR is generally accepted to be 32 dB. Thus according to Shannon's law, the theoretical maximum capacity C is approximately 34 kbps. Turbo Coded Modulation (TCM), as implemented in the ITU-T V.34 standard, describes the methods used to approach the theoretical maximum limit.

By taking advantage of the CO side circuitry operating at 8 kHz, the 3.4 kHz limit imposed by the PSTN is doubled and the bandwidth of the bearer channel BW is increased by a factor of two to achieve a theoretical maximum capacity C of approximately 64 kbps. The ITU-T V.90 standard describes the methods used to achieve communications close to the theoretical maximum limit. V.90 is currently the fastest standard for analog dial-up modem communications.

Digital subscriber line (DSL or xDSL) modems, which communicate using a variety of DSL standards such as ADSL, VDSL, SHDSL, SDSL and HDSL, do not dial through the PSTN as described above. Rather, the CO and the CPE modems are directly wired to each other. This direct connection allows for usable bandwidth of up to around 12 MHz depending on the length of the loop. The bandwidth is often shared with the PSTN, for example during ADSL and VDSL communications, thereby allowing voice calls and data calls to coexist on the same line.

While DSL communications are superior in terms of speed over their analog counterparts discussed above, many computer users do not have DSL modems and are therefore limited to the comparatively slow speeds of their analog dial-up modems. Therefore, a need presently exists for a faster modem method and apparatus.

SUMMARY

By way of introduction, the preferred embodiments described below provide a faster modem apparatus and method. A faster modem apparatus comprises a subscriber line port, a central office line port, a low pass filter connected to the subscriber line port and the central office line port, and isolation circuitry connected to the subscriber line port. The faster modem apparatus further comprises a switch connected to the isolation circuitry, a hybrid unit connected to the switch, a line driver connected to the switch and connected to the isolation circuitry. The faster modem apparatus still further comprises an analog front end connected to the line driver and the hybrid unit, a digital signal processor in communication with the analog front end, and a compression engine in communication with the digital signal processor. The digital signal processor comprises a microprocessor interface for interfacing the faster modem apparatus with an external processor or termination equipment. A faster analog modem communication system comprises termination equipment, such as the faster modem apparatus, in communication with customer premise equipment, such as an analog soft-modem comprising a codec. A faster analog modem method utilizes an unused portion of the codec operating range to code and decode data signals. Coded analog signals are transmitted and received at a level of greater than −9 dBm. The unused portion of the codec operating range comprises operating frequencies above 8 kHz. The unused portion of the codec operating range further comprises those operating frequencies such that signals above 4 kHz are coded and decoded. The termination equipment, such as the faster modem apparatus, is also operable to transmit and receive analog signal at a level of greater than −9 dBm. The termination equipment is also operative to transmit and receive analog signals including those signals having frequencies above 4 kHz.

The foregoing paragraph has been provided by way of general introduction, and it should not be used to narrow the scope of the following claims. The preferred embodiments will now be described with reference to the attached drawings.

DETAILED DESCRIPTION OF THE PRESENTLY PREFERRED EMBODIMENTS

Figure 1:
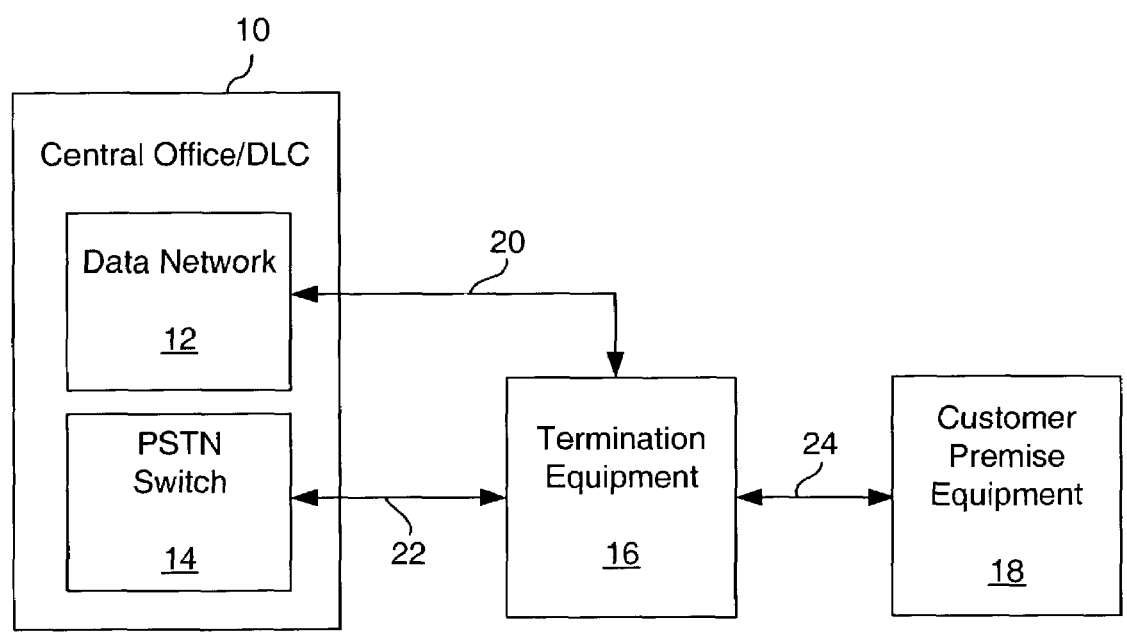
FIG. 1 is a communication system for voice and data communications.

Turning to FIG. 1, a communication system for voice and data communications is shown. Termination equipment 16 may be part of a central office or digital loop carrier (CO) 10 or may be connected between customer premise equipment (CPE) 18 and the CO 10 as shown in FIG. 1. The termination equipment 16 terminates subscriber line 24 and provides a separate voice line 22 and data line 20 to PSTN switch 14 and data network 12 respectively at the CO 10. Depending on the termination equipment 16 and the customer premise equipment device 18, subscriber line 24 may carry various forms of communications such as DSL, voice calls, and dial-up modem calls. Subscriber line 24 may be a twisted pair conductor, or POTS (plain old telephone system) line, which are common to the public switched telephone network. Subscriber line 24 may comprise other types of lines, such as coaxial cable.

Termination equipment 16 provides the necessary switching, interfaces, and signaling to enable said various forms of communications between the CO 10 and the CPE 18. Examples of termination equipment are DSLAMs (digital subscriber line access multiplexers), and channel banks. Another example of termination equipment is a universal broadband server, which is a device operable to provide various types and levels of data and voice services to subscribers.

Multiple customer premise equipment devices 18 may be connected to a single termination equipment device 16 thereby providing voice and data services to multiple subscribers from a single device. The termination equipment may be located in a pedestal box, cross-connect cabinet, service area cross-connect, service area interface, or other box or cabinet located between a customer's home or business and the central office or digital loop carrier. The terms "pedestal box", "cross-connect cabinet", "service area cross-connect", and "service area interface" are used interchangeably herein. The cross-connect cabinet is typically located less than 6000 feet from the subscriber. This location provides a short loop and access to a wide frequency spectrum.

Figure 2:
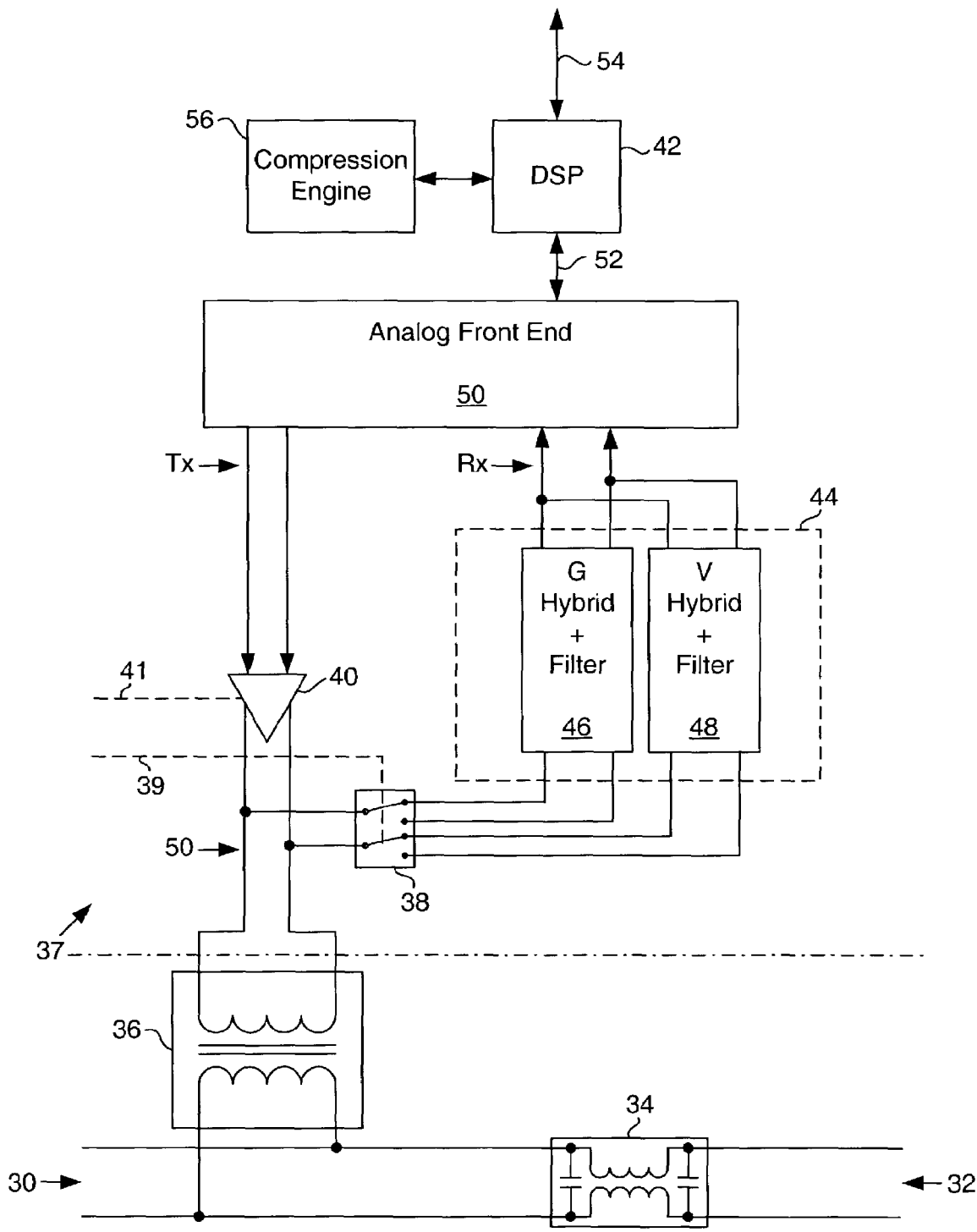
FIG. 2 is a faster modem apparatus.

A faster modem apparatus for communicating with customer premise equipment, such as soft-modems, is shown in FIG. 2. The faster modem apparatus interfaces with an external processor or termination equipment, such as termination equipment 16 of FIG. 1, via a microprocessor interface 54. The apparatus includes a subscriber line port 30 for connecting to a subscriber line, such as subscriber line 24 of FIG. 1, and a central office port 32 for connecting to a voice line, such as voice line 22 of FIG. 1. A low pass filter 34 coupled to the subscriber line port 30 and the central office port 32 separates voice band signals from higher frequency data communication signals. The low pass filter 34 is also referred to as an ADSL POTS splitter. The low pass filter 34 is preferably an 8 kHz low pass filter and may be further compliant with the ANSI T1.413 specification. Isolation circuitry 36 connected to the subscriber line port 30 provides isolation between a subscriber line and additional isolated circuitry 37 of the faster modem apparatus. Many types of isolation circuitry may be used, such as a 1:1 transformer. The transformer may further have an insertion loss of less than 3 dB.

The isolation circuitry 36 is further connected to a switch 38 and the outputs of a line driver 40. Both the switch 38 and the line driver 40 are controlled via control lines 39 and 41 respectively. The control lines are coupled to the external processor or termination equipment to which the faster modem apparatus is connected. The switch 38 and line driver 40 may alternatively be controlled via control lines 39 and 41 respectively by the additional isolated circuitry 37 of the faster modem apparatus, such as a digital signal processor 42. The switch 38 may be many types of switches such as a double-pole-double-throw relay. The line driver 40 is a line driver with shut-down control such that the line driver is operable to be switched on and off via line driver control line 41. Line drivers of this type are sold by many manufacturers and are commonly found in many types of telecommunication equipment.

A hybrid unit 44 is connected to switch 38. The hybrid unit comprises a first hybrid 46 and a second hybrid 48. The first hybrid 46, labeled "G Hybrid+Filter" in FIG. 2, is a DSL hybrid and high pass filter, such as an ADSL hybrid, for filtering and separating two-line bi-directional DSL communication signals on lines 50 into receive only signals indicated by label "Rx" in FIG. 2. The first hybrid 46 may further be compliant with the ITU-T G.992.1 or ITU G.992.2 specifications. The high pass filter of the first hybrid 46 is a high pass filter such as a 20 kHz high pass filter.

The second hybrid 48, labeled "V Hybrid+Filter" in FIG. 2, is a voice band/analog modem band hybrid with low pass filter for separating two-line bi-directional voice or analog modem signals on lines 50 into receive only signals indicated by the label "Rx" in FIG. 2. The second hybrid may be compliant with ITU-T V series specifications such as the ITU-T V.90 specification. The low pass filter of the second hybrid 48 is a low pass filter such as a 20 kHz low pass filter.

An analog front end 50 is connected to the inputs of line driver 40 and to the outputs of hybrid unit 44. The analog front end 50 comprises codecs, or analog-to-digital and digital-to-analog converters. Analog receive signals are received through subscriber port 30 via a subscriber line connected to subscriber port 30, through isolation circuitry 36, through switch 38, and into hybrid unit 44. The analog front end converts analog receive signals ("Rx") from the output of hybrid unit 44 into receive digital signals 52 for interfacing with the digital signal processor 42 and communicating with other equipment and processors, such as termination equipment, via microprocessor interface 54.

The analog front end 50 further converts transmit digital signals 52 from the digital signal processor 42 into analog transmit signals ("Tx") for input into line driver 40 and output onto a subscriber line connected to subscriber port 30 via isolation circuitry 36. As indicated in FIG. 2, switch 38 selects the appropriate first hybrid 46 or second hybrid 48 in hybrid unit 44 for effecting DSL communications or voice/analog modem communications, respectively.

The digital signal processor 42 is further in communication with a compression engine 56 for compressing and decompressing digital transmit and receive data according to an array of standards, such as the ITU-T V.42/V.42bis standard.

Many digital signal processors 42 may be used, such as those sold by GlobeSpan, Inc. Many modifications may be made to the faster modem apparatus. For example more than one digital signal processor 42 may be concurrently used, more than one type of compression engine 56 may be used, and additional hybrids may be used in the hybrid unit 44. Further modifications include a switch between digital signal processor 42 and analog front end 50 for further switching digital data 52. Additionally, digital signal processor 52 may comprise means for interfacing the digital signal processor 52 directly with high speed digital communication lines such as T1, T3, xDSL, ISDN, OCn, and the like. Further modifications will be evident to those of ordinary skill in the art.

Figure 3:
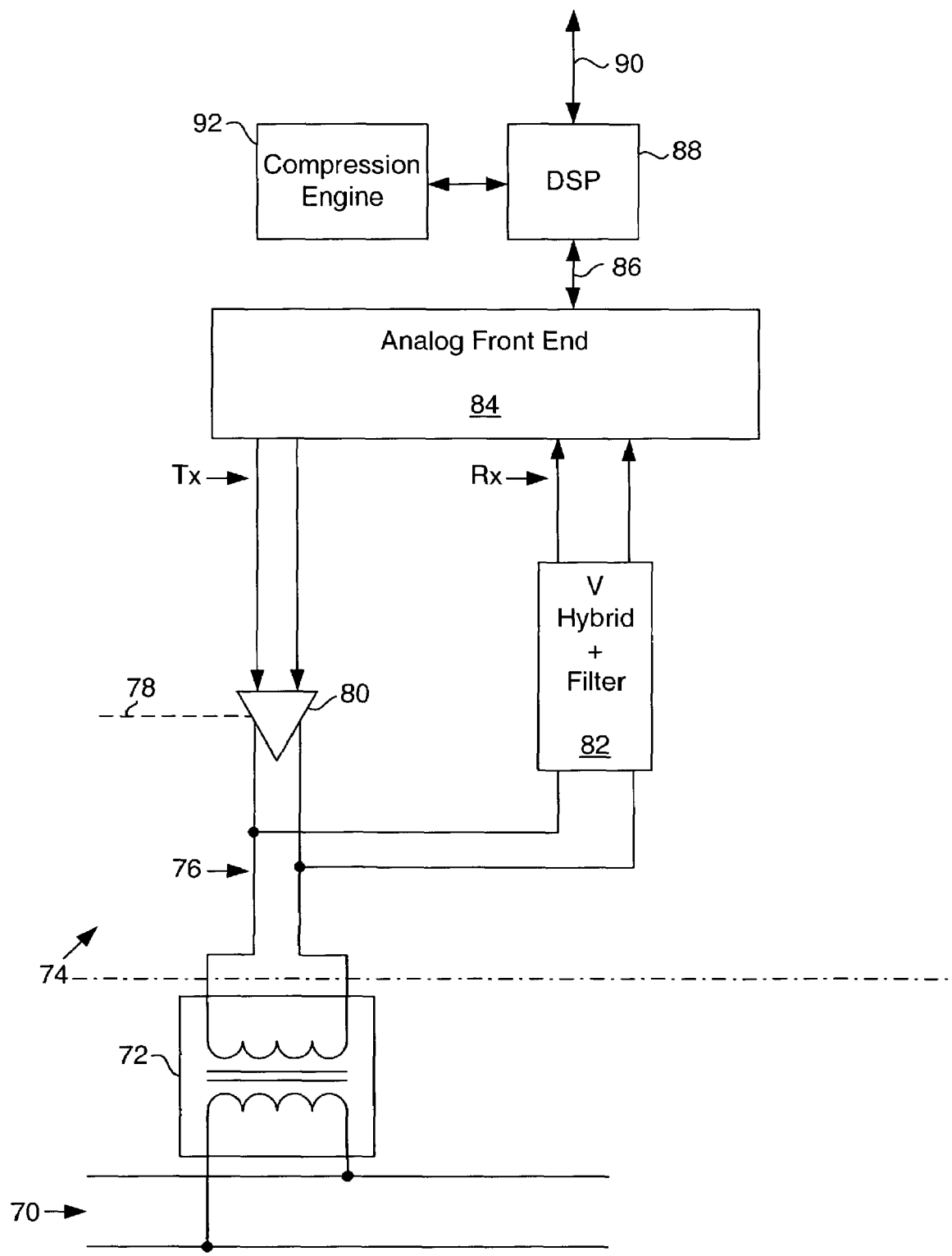
FIG. 3 is an alternative embodiment of a faster modem apparatus.

FIG. 3 shows an alternative embodiment of the faster modem apparatus, for communicating with customer premise equipment, such as soft-modems. The faster modem apparatus of FIG. 3 interfaces with an external processor or termination equipment, such as termination equipment 16 of FIG. 1, via microprocessor interface 90. The apparatus includes a subscriber line port 70 for connecting to a subscriber line, such as subscriber line 24 of FIG. 1, and for connecting to a voice line, such as voice line 22 of FIG. 1. The apparatus in FIG. 3 removes the low pass filter 34 of the apparatus of FIG. 2. The filter is not necessary since the faster modem apparatus of FIG. 3 does not engage in DSL communications. The apparatus of FIG. 3 is able to communicate according to dial-up modem and faster analog modem methods as described herein.

Isolation circuitry 72 connected to the subscriber line port 70 provides isolation between a subscriber line and additional isolated circuitry 74 of the faster modem apparatus. Many types of isolation circuitry may be used, such as a 1:1 transformer. The transformer may further have an insertion loss of less than 3 dB.

The isolation circuitry 74 is further connected to the outputs of a line driver 80 and the inputs of hybrid 82. The hybrid 82 is a voice band/analog modem band hybrid with low pass filter labeled "V Hybrid+Filter" as described above in accordance with the apparatus of FIG. 2. The line driver 80 is also of the same type as described above and is controlled via a line driver control line 78 as described above.

An analog front end 84 is connected to the inputs of line driver 80 and to the outputs of hybrid unit 82. A digital signal processor 88 communicates digital transmit and receive signals 86 with the analog front end 84. A compression engine 92 is also connected to the digital signal processor 88. The analog front end 84, digital signal processor 88, and compression engine 92 are described above in accordance with FIG. 2. Many modifications, such as those described above, can be made to the apparatus of FIG. 3.

As shown and described, the faster modem apparatus of FIGS. 2 and 3 provides a means for terminating a subscriber line, and a means for carrying out multiple types of communication, such as voice, DSL, or analog modem, from a single device connected to the subscriber line. Depending on the type of customer premise equipment device, such as a voice telephone, V series analog modem, faster analog modem such as described herein, or DSL modem, the faster modem apparatus of FIGS. 2 and 3 are configured to communicate using the appropriate protocols and signaling.

The faster modem apparatus of FIG. 2 also provides a means for conducting simultaneous data and voice communications on a single subscriber line.

As discussed, dial-up modems take a phone line off-hook by applying a current load to the line. With the faster modem apparatus of FIG. 2 or 3, in conjunction with customer premise equipment such as the faster analog modem described herein, the PSTN voice switch (14 of FIG. 1) should be prevented from answering a call for faster modem service.

To prevent the PSTN voice switch from answering the call for faster modem service the phone-line is never taken off-hook upon initiating the analog or faster analog modem call. The modem driver may be modified to prevent the phone-line from being taken off-hook. The modification may, in part, include issuing a Hayes AT modem command "ATD" to the analog modem rather than the usual "ATDT" command.

An alternative method physically disconnects the line from the central office when an "authorized" telephone number is dialed. This prevents the call from going through the PSTN by removing the customer from the PSTN.

Another alternative method uses voice switch signaling. A preamble is dialed to the phone number and the voice or PSTN switch is signaled by the presence of the preamble not to answer the call. For example, by adding the numbers "#55" to the beginning of the phone number, the voice switch ignores the call by at least in part removing the dial tone and not recognizing further DTMF signals. Upon recognizing the dialed telephone number, such as "#55 xxx-xxxx", the termination equipment, such as the faster modem apparatus or the faster modem apparatus in conjunction with additional termination equipment like a universal broadband server, answers the dial-up modem call, such as a V.90 call.

As discussed above, soft-modems digitize, or sample, signals in the voice band up to around 4 kHz. Soft-modems are designed for voice band communications and are therefore not capable of digitizing or sampling signals in the ADSL band, or any other DSL technology band. As used herein, the term "codec operating range" is defined broadly to mean the range of frequencies at which a codec can operate to sample, or digitize, signals. For example, if a codec has an operating range of 44 kHz, and is operating at 44 kHz, then the codec can effectively code and decode signals of up to 22 kHz in frequency. Or, if a codec has an operating range of 44 kHz but is only operating at 8 kHz, then the codec can effectively code and decode signals of up to 4 kHz in frequency.

While codecs in most soft modems operate at only up to 8 kHz, their operating range extends far beyond 8 kHz. Specifically, most soft-modem codecs can operate at up to 12 kHz, and often up to 44 kHz. Therefore, most soft-modem codecs have a bandwidth, or can sample signals, from around 6 kHz to 22 kHz, much greater than the 4 kHz currently used.

Additionally, while the transmission level of soft-modems is limited by PSTN requirements to −9 dBm, most soft-modems are capable of transmitting and receiving signals at a much higher level, for example at 0 dBm. As with most of the operational characteristics of soft-modems, the digitizing frequency range and transmitting and receiving levels are controlled by the driver software running on the host computer of the soft-modem.

A faster analog modem communication method utilizes the unused codec operating range of the soft-modem above the 4 kHz voice band, as well as the soft-modem's ability to transmit and receive signals at a signal level above −9 dBm. The faster analog modem communication method may be implemented on both the customer premise equipment side, and at the termination equipment side, such as in the faster modem apparatus described above, to effect a bi-directional increase in communication speed.

The faster analog modem in communication with a remote communication device, such as termination equipment, utilizes an unused portion of the analog modem codec operating range to code and decode data signals. This unused portion may range from around 8 kHz to around 44 kHz, therefore allowing the sampling of signals above 4 kHz in frequency. Additionally, upstream coded analog signals (signals traveling from the customer premise equipment to the remote communication device) are transmitted at a level of greater than −9 dBm between the remote communication device and faster analog modem at the customer premise. Downstream coded analog signals (signals traveling from the remote communication device to the customer premise equipment) are received at a level of greater than −9 dBm between the remote communication device and the faster analog modem at the customer premise. The coded analog signals may be transmitted at 0 dBm or even up to 5 dBm to overdrive the loss in the loop, typically around 4 dB, thereby achieving a signal level of 0 dBm at the receiver of the remote communication device or customer premise equipment. Coded analog signals may be received at 0 dBm meaning that the transmitting device is transmitting at a level of at least 0 dBm, such as around 5 dBm.

By increasing the signals levels to 0 dBm upstream and 5 dBm downstream in conjunction with a low noise floor it is feasible to realize a signal-to-noise ratios of 40 dB to 90 dB. Applying Shannon's law using the increased coding and decoding speeds and increased transmit and receive signal levels described above, the following theoretical unidirectional communication capacities are shown in Table 1:

TABLE I

| Bandwidth (BW) | SNR | Capacity (C) (kbps) |
|---|---|---|
| 6 | 32 | 64 |
|   | 41 | 82 |
|   | 50 | 100 |
|   | 60 | 120 |
|   | 70 | 140 |
|   | 80 | 160 |
| 10 | 32 | 106 |
|   | 41 | 136 |
|   | 50 | 166 |
|   | 60 | 200 |
|   | 70 | 232 |
|   | 80 | 265 |
| 16 | 32 | 170 |
|   | 41 | 217 |
|   | 50 | 265 |
|   | 60 | 320 |
|   | 70 | 372 |
|   | 80 | 425 |
| 20 | 32 | 212 |
|   | 41 | 272 |
|   | 50 | 332 |
|   | 60 | 400 |
|   | 70 | 465 |
|   | 80 | 531 |

As indicated above, a unidirectional capacity of greater than 500 kbps. By contrast current soft-modems have a maximum capacity of 64 kbps maximum.

Figure 4:
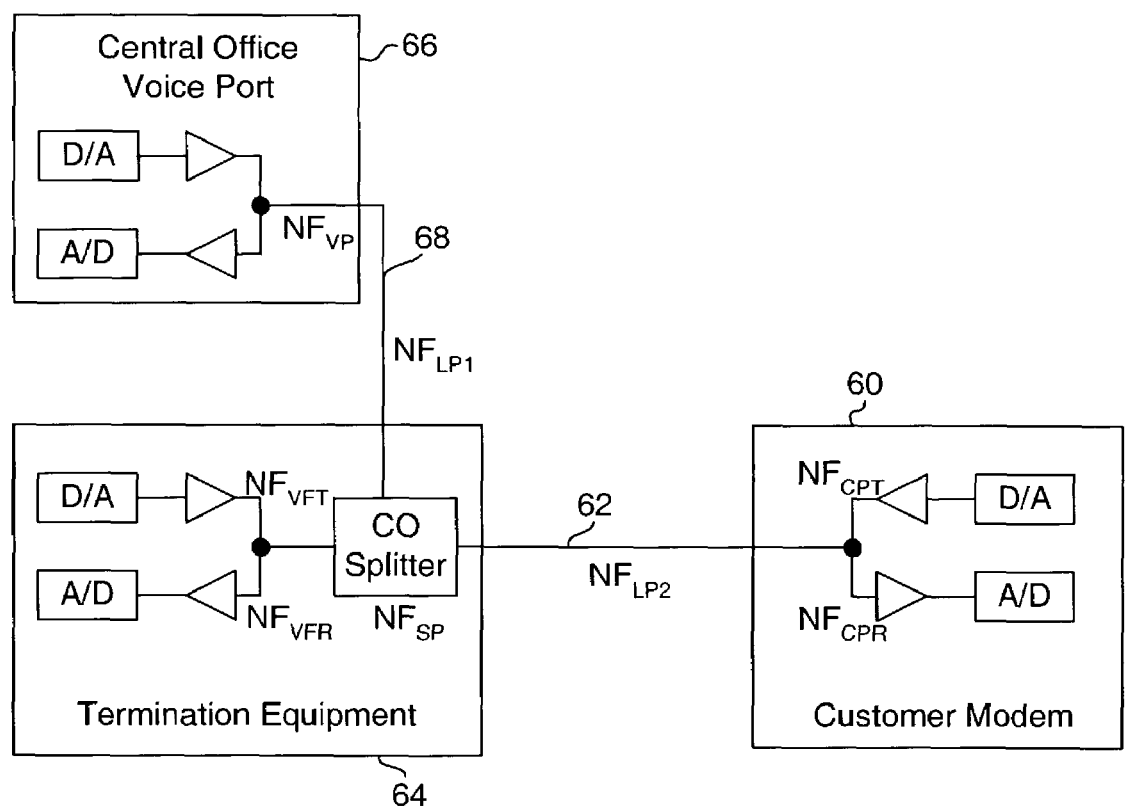
FIG. 4 is a communication system for noise floor calculations.

A value for the noise floor necessary for making the calculations of Table 1 is calculated by referring to FIG. 4.

A customer modem 60 such as a soft-modem is connected by a subscriber line 62 to termination equipment 64 such as the faster modem apparatus of FIG. 2. The termination equipment 64 is further connected to a central office voice port via a central office voice line 68. Referring to FIG. 4, the following labels used for the noise floor calculation are indicated below:

$NF_{TH}$=Thermal Noise Factor=−175dBm/Hz
$NF_{VP}$=CO Voice Port Noise Factor in IDLE mode
$NF_{LP1}$=CO to Pedestal Loop Noise Factor
$NF_{VFT}$=UBS Port Transmitter Noise Factor
$NF_{VFR}$=UBS Port Receiver Noise Factor
$NF_{SP}$=CO Splitter Noise Factor
$NF_{LP2}$=Pedestal to customer Noise Factor
$NF_{CPT}$=CPE Transmitter Noise Factor
$NF_{CPR}$=CPE Receiver Noise Factor
$NF_{XT}$=Cross-Talk Noise Factor (Cross-talk represents the noise added due to cross-talk between multiple loops connected, for example, between termination equipment 64 and multiple customer modems 60.)

So, the overall downstream noise factor $NF_D$ is therefore:

$$NF_D = NF_{TH} + NF_{VP} + NF_{LP1} + NF_{VFT} + NF_{SP} + NF_{LP2} + NF_{CPR} + NF_{XT},$$

and the overall upstream noise factor $NF_U$ is:

$$NF_U = NF_{TH} + NF_{VP} + NF_{LP1} + NF_{VFR} + NF_{SP} + NF_{LP2} + NF_{CPT} + NF_{XT}.$$

In the frequency range below 20 KHz, passive components comprising the devices shown in FIG. 4, such as resistors and capacitors, have a negligible noise factor compared to active components, such as integrated circuit elements. Therefore the noise factor of the transmission paths will be limited by the transmitters, receivers, and cross-talk. A noise factor of −40 dBm to −80 dBm is typical in a system such as shown in FIG. 4.

Through modifications to the modem driver running on the host computer of the soft-modem, most soft-modems can achieve the increased speeds shown in Table 1. Handshaking, synchronization techniques, and standards currently employed in soft-modems are used in the faster soft-modem. For example handshaking between the termination equipment and CPE modem employing the faster modem method comprise the well understood ITU-T V.8/V.8bis handshake protocol. Similarly, ITU-T V.14 synchronization techniques, and ITU-T V.42/V.42bis compression techniques are used. ITU-T V.34 modulation techniques are also employed. Optionally, PAM, QAM, CAP or DMT modulation techniques can be substituted for or combined with the V.34 modulation techniques.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A faster modem apparatus comprising:
   a subscriber line port;
   a central office line port;
   a first low pass filter connected to said subscriber line port and said central office line port;
   isolation circuitry connected to said subscriber line port;
   a switch connected to said isolation circuitry, said switch comprising a switch control line;

a line driver connected to said switch and said isolation circuitry;

an analog front end connected to said line driver;

a hybrid unit connected to said switch and said analog front end, wherein said hybrid unit comprises a first hybrid adapted to receive high frequency signals and a second hybrid adapted to receive low frequency signals, and wherein one of the first and second hybrids is selectively connected between the isolation circuitry and the analog front end via said switch;

a digital signal processor in communication with said analog front end, said digital signal processor comprising a microprocessor interface.

2. The invention of claim 1 wherein said first hybrid comprises a DSL hybrid and a high pass filter.

3. The invention of claim 2 wherein said DSL hybrid is an ADSL hybrid.

4. The invention of claim 2 wherein said high pass filter is a 20 kHz high pass filter.

5. The invention of claim 1 wherein said second hybrid comprises an analog modem hybrid and a second low pass filter.

6. The invention of claim 5 wherein said second low pass filter is a 20 kHz low pass filter.

7. The invention of claim 1 wherein said first low pass filter is an 81 ci-lz low pass filter.

8. The invention of claim 1 wherein said isolation circuitry is a 1:1 transformer.

9. The invention of claim 8 wherein said transformer has an insertion loss of less than 3 dB.

10. The invention of claim 1 wherein said switch is a double-pole-double-throw relay.

11. The invention of claim 1 wherein said line driver comprises a line driver control line, and wherein the line driver is operative to be switched on and off by said line driver control line.

12. The invention of claim 1 further comprising a compression engine in communication with said digital signal processor, and wherein said compression engine is a V.42/V.42bis compression engine.

13. The invention of claim 1 wherein said analog front end is operative to code and decode signals above 4 KHz in frequency.

* * * * *